(12) United States Patent
Katayama et al.

(10) Patent No.: US 12,034,349 B2
(45) Date of Patent: Jul. 9, 2024

(54) TRANSFER APPARATUS AND TRANSFER METHOD

(71) Applicant: YAMAHA HATSUDOKI KABUSHIKI KAISHA, Iwata (JP)

(72) Inventors: Manabu Katayama, Iwata (JP); Shunsuke Aoki, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 246 days.

(21) Appl. No.: 17/759,090

(22) PCT Filed: May 15, 2020

(86) PCT No.: PCT/JP2020/019376
§ 371 (c)(1),
(2) Date: Jul. 19, 2022

(87) PCT Pub. No.: WO2021/229781
PCT Pub. Date: Nov. 18, 2021

(65) Prior Publication Data
US 2023/0040955 A1 Feb. 9, 2023

(51) Int. Cl.
*H02K 41/03* (2006.01)
*B65G 47/74* (2006.01)
*B65G 54/02* (2006.01)

(52) U.S. Cl.
CPC ............. *H02K 41/03* (2013.01); *B65G 47/74* (2013.01); *B65G 54/02* (2013.01)

(58) Field of Classification Search
CPC ......... H02K 41/03; B65G 47/74; B65G 54/02
(Continued)

(56) References Cited

U.S. PATENT DOCUMENTS

| 10,734,880 B2 * | 8/2020 | Urata .................... H02K 41/031 |
| 2007/0070118 A1 * | 3/2007 | Nakata ................... B41J 19/207 |
| | | 347/37 |
| 2018/0095112 A1 | 4/2018 | Weiss |

FOREIGN PATENT DOCUMENTS

| JP | 2006-141141 A | 6/2006 |
| JP | 2010-057280 A | 3/2010 |

(Continued)

OTHER PUBLICATIONS

Jung et al. (KR 20130117191 A)Transfering Device of Processing Unit Date Published Oct. 25, 2013 (Year: 2013).*

(Continued)

*Primary Examiner* — Jorge L Carrasquillo
(74) *Attorney, Agent, or Firm* — Studebaker & Brackett PC

(57) ABSTRACT

A transfer apparatus includes a first linear transfer part which moves a slider in a first direction by using a first fixed linear module fixed on a first base; a module moving part which moves a module holding member holding a movable linear module in a second direction different from the first direction, to position the movable linear module at a first coupling position to couple with the first fixed linear module and cause the slider to transfer between the movable and first fixed linear modules; a linear scale having a scale extending in the second direction and a sensor which detects the scale; and a controller which acquires first module position information indicating a position of the movable linear module relative to the first fixed linear module in the second direction and controls movement of the module holding member based on the first module position information.

19 Claims, 9 Drawing Sheets

(58) Field of Classification Search
USPC .......................................................... 318/135
See application file for complete search history.

(56) References Cited

FOREIGN PATENT DOCUMENTS

| | | |
|---|---|---|
| JP | 2019-062614 A | 4/2019 |
| JP | 2019-103225 A | 6/2019 |
| WO | 2018055709 A1 | 3/2018 |

OTHER PUBLICATIONS

Irita (JP 2002026596 A) Device and Method for Moving Work Head Date Published Jan. 25, 2002 (Year: 2002).*
International Search Report issued in PCT/JP2020/019376; mailed Aug. 11, 2020.

* cited by examiner

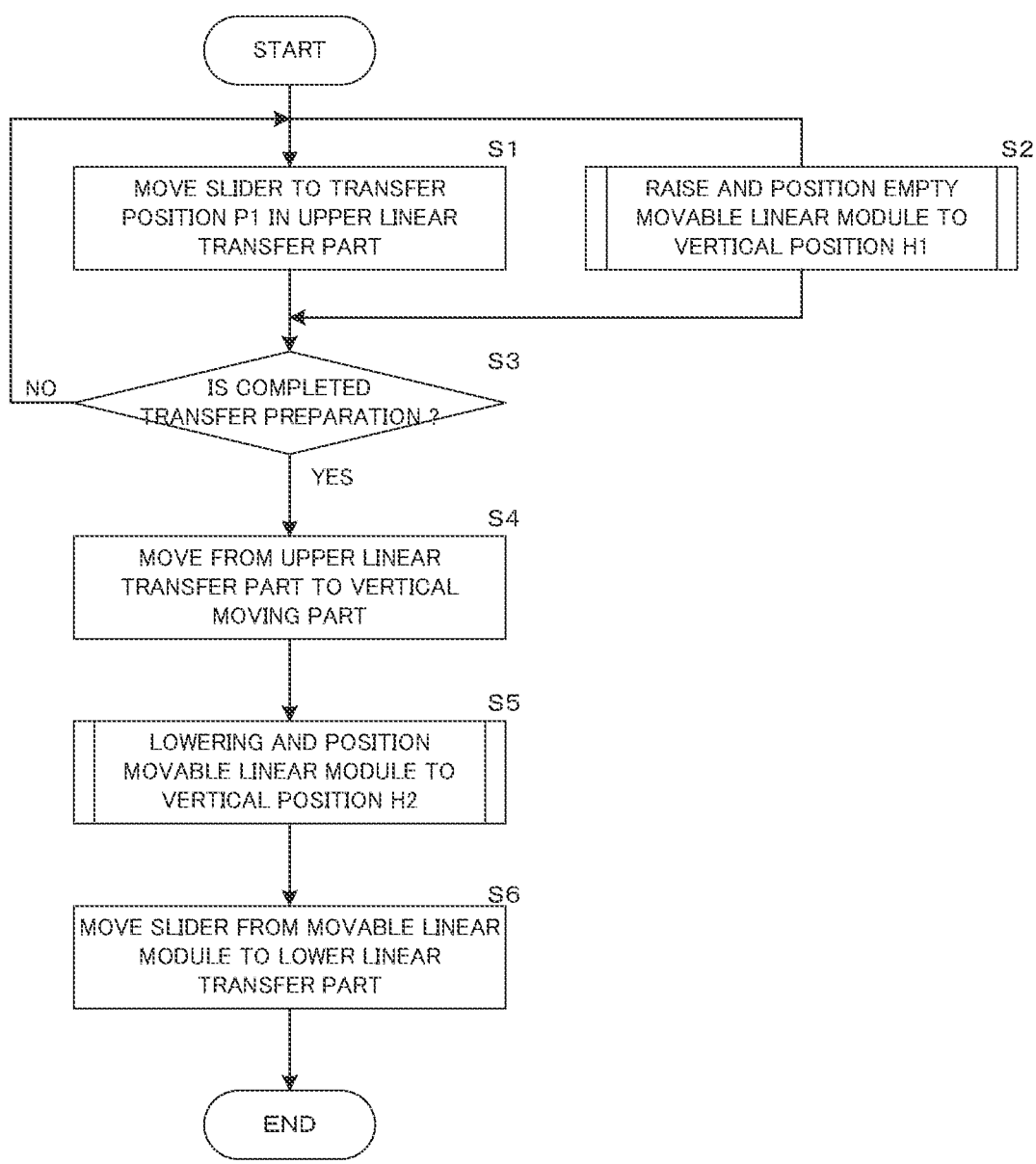

TRANSFER APPARATUS AND TRANSFER METHOD

CROSS-REFERENCE TO RELATED APPLICATION

This application is a National Stage of International Patent Application No. PCT/JP2020/019376, filed May 15, 2020, the entire contents of which is incorporated herein by reference.

BACKGROUND

Technical Field

The present disclosure relates to a transfer technology for positioning a movable linear module relative to a fixed linear module and then causing a slider to transfer between the fixed linear module and the movable linear module, to thereby transfer a transfer object.

Background Art

In recent years, a transfer apparatus for transferring a transfer object by using a moving magnet type linear motor has been proposed. In WO 2018/055709, for example, a first linear transfer part in which linear modules each having a stator are coupled with one another in a first direction is fixedly arranged. Further, second linear transfer parts each having the same structure as that of the first linear transfer part are arranged in parallel, away from each other, in a second direction orthogonal to the first direction. Herein, in the first linear transfer part, by controlling energization of a coil of the stator, a slider having a mover is moved along the stators of the linear modules. The transfer object held by the slider is thereby transferred by the first linear transfer part in the first direction.

Furthermore, in order to cause the transfer object to transfer from the first linear transfer part to the second linear transfer part and change a transfer direction, a first direction change part is provided on one end side of the two linear transfer parts in the first direction. This first direction change part has a movable linear module configured to be movable in the second direction. When the transfer from the first linear transfer part to the second linear transfer part is performed, the movable linear module is positioned at a coupling position where the movable linear module is to be coupled with a fixed linear module forming one end of the first linear transfer part. Subsequently, by controlling the energization of the coil of the stator, the slider transfers from the first linear transfer part to the first direction change part. Then, by controlling the energization of the coil of the stator after the movable linear module holding the slider is moved by the first direction change part to the coupling position where the movable linear module is to be coupled with the fixed linear module forming the one end of the second linear transfer part, the slider transfers from the first direction change part to the second linear transfer part. Subsequently, by controlling the energization of the coil of the stator in the second linear transfer part, the slider is moved to a direction opposite to the first linear transfer part, to thereby transfer the transfer object to the other end side of the second linear transfer part.

Moreover, a second direction change part having the same structure as that of the first direction change part is provided on the other end side of the two linear transfer parts in the first direction. For this reason, like the first direction change part, the second direction change part moves the slider to the second linear transfer part, the second direction change part, and the first linear transfer part in this order, to thereby transfer the transfer object to the other end side of the first linear transfer part. Thus, in the transfer apparatus disclosed in WO 2018/055709, it is possible to circularly move the slider.

SUMMARY

In order to smoothly cause the slider to transfer between the linear transfer part and the direction change part, it is necessary to position the linear module of the direction change part relative to the linear module of the linear transfer part in the second direction with high accuracy. Then, while the movable linear module is moving, the conventional transfer apparatus causes part of the direction change part to come into contact with a positioning member which is fixedly arranged in advance, to thereby position the movable linear module at a transfer position. Thus, since such mechanical positioning is performed, the positioning accuracy is sometimes reduced due to deformation caused by temperature change, abrasion or the like of the direction change part, the positioning member, or the like, and it becomes difficult to smoothly cause the slider to transfer.

Further, the transfer accuracy can be maintained by regular maintenance. Since the conventional apparatus cannot quantitatively measure the transfer accuracy, however, it is necessary to separately perform precision adjustment using a measuring means such as a dial gauge or the like and it takes person-hours therefor. Furthermore, similarly in the start-up time, it takes person-hours to perform the precision adjustment.

Accordingly, the present disclosure provides a transfer technology for causing a slider to stably transfer between linear modules in the long term and favorably transferring a transfer object, without performing any special precision adjustment.

One aspect of the present disclosure is a transfer apparatus for moving a slider holding a transfer object to thereby transfer the transfer object and includes a first linear transfer part configured to move the slider in a first direction by using a first fixed linear module fixed on a first base: and a module moving part configured to move a module holding member holding a movable linear module in a second direction different from the first direction, to thereby position the movable linear module at a first coupling position where the movable linear module is to be coupled with the first fixed linear module and making it possible to cause the slider to transfer between the movable linear module and the first fixed linear module. The transfer apparatus further includes a linear scale having a scale extending in the second direction and a sensor configured to detect the scale, in which one of the scale and the sensor is attached to the first linear transfer part and the other is attached to the module moving part: and a control part configured to acquire first module position information indicating a position of the movable linear module relative to the first fixed linear module in the second direction on the basis of a detection result of the sensor and to control a move of the module holding member on the basis of the first module position information.

Another aspect of the present disclosure is a transfer method for moving a slider holding a transfer object between a linear transfer part for moving the slider in a first direction by using a fixed linear module fixed on a base and a module moving part for moving a module holding member holding a movable linear module in a second direction different from the first direction, to thereby transfer the transfer object. A scale is attached to one of the linear transfer part and the module moving part, extending in the second direction, and a sensor for detecting the scale is attached to the other. The transfer method includes acquiring module position information indicating a position of the movable linear module relative to the fixed linear module in the second direction on the basis of a detection result of the sensor; moving the module holding member in the second direction on the basis of the module position information to thereby position the movable linear module at a coupling position where the movable linear module is to be coupled with the fixed linear module and making it possible to cause the slider to transfer between the movable linear module and the fixed linear module; and moving the slider in the first direction between the fixed linear module and the movable linear module which are coupled with each other.

In the present disclosure having such a configuration, the scale extending in the second direction is attached to the linear transfer part (or the module moving part). On the other hand, the sensor is attached to the module moving part (or the linear transfer part), and it is thereby possible to detect the scale. For this reason, the module position information indicating a position of the movable linear module relative to the fixed linear module in the second direction is accurately acquired from the detection result of the sensor. Then, the movable linear module is positioned at the coupling position where the movable linear module is to be coupled with the fixed linear module, on the basis of the module position information. As a result, the transfer of the slider is stably performed between the fixed linear module and the movable linear module.

Herein, the module moving part may have a moving mechanism configured to move the module holding member in the second direction and an encoder configured to acquire encoder information indicating a position of the module holding member in the second direction. In this case, the control part may be configured to acquire the first module position information on the basis of the detection result of the sensor and the encoder information and position the movable linear module at the first coupling position on the basis of the first module position information. Thus, by using the encoder information as well as the detection result of the sensor in order to acquire the first module position information, a section to be detected in the second direction by the linear scale is shortened, and it is possible to ensure size reduction of the scale and thereby ensure the cost reduction.

As one example of using both the detection result of the sensor and the encoder information as described above, a section where the sensor detects the scale in the second direction may be determined as a linear scale section and another section where the sensor does not detect the scale may be determined as a non-linear scale section. In this case, the control part may be configured to acquire the first module position information on the basis of the detection result of the sensor in the linear scale section and acquire the first module position information on the basis of the encoder information in the non-linear scale section. Thus, the linear scale section is shortened by the non-linear scale section, and it is possible to ensure size reduction of the scale.

Further, as another example of using both the detection result of the sensor and the encoder information as described above, a section where the sensor detects the scale in the second direction may be determined as a linear scale section, another section where the sensor does not detect the scale may be determined as a non-linear scale section, and a partial section of the linear scale section, which is adjacent to the non-linear scale section, may be determined as a synthesis section. Then, by acquiring the first module position information on the basis of the detection result of the sensor and the encoder information in the synthesis section, it is possible to suppress discontinuity of the first module position information as described later in detail.

Furthermore, in order to completely remove the discontinuity, in the synthesis section, for example, the transfer apparatus may be configured so that a weighting factor k ($0 \leq k \leq 1$) in accordance with the detection result of the sensor is obtained and the first module position information is obtained on the basis of the following equation:

(the first module position information)=(the detection result of the sensor)*k+(the encoder information)*(1−k). It is thereby possible to suppress discontinuous change of the first module position information and smoothly move the movable linear module. As a result, it is possible to further stably transfer the transfer object.

Further, the transfer apparatus may further include a second linear transfer part configured to move the slider in the first direction by using a second fixed linear module fixed on a second base provided away from the first base in the second direction. Then, the module moving part may be configured to position the movable linear module at a second coupling position where the movable linear module is to be coupled with the second fixed linear module and make it possible to cause the slider to transfer between the movable linear module and the second fixed linear module. Furthermore, the control part may be configured to acquire second module position information indicating a position of the movable linear module relative to the second fixed linear module in the second direction on the basis of the detection result of the sensor and moves the movable linear module between the first coupling position and the second coupling position on the basis of the first module position information and the second module position information. It is thereby possible to move the slider to the first fixed linear module, the first coupling position, the movable linear module, the second coupling position, and the second fixed linear module in this order or in the reverse order, and possible to transfer the transfer object over a wide range.

Further, the module moving part may have a first moving mechanism coupled with a first holding portion of the module holding member, for moving the module holding member in the second direction, and a second moving mechanism coupled with a second holding portion of the module holding member, which is different from the first holding portion, for moving a second module holding member in the second direction. Then, the linear scale may be provided corresponding to each of the first moving mechanism and the second moving mechanism. In this case, a move control of the first holding portion by the first moving mechanism and that of the second holding portion by the second moving mechanism can be performed independently of each other, and the moving posture of the movable linear module can be stabilized. As a result, it is possible to further stably transfer the transfer object.

Furthermore, the control part may have a host for instructing a move destination of the movable linear module and a dedicated driver part for controlling the move of the module holding member on the basis of the detection result of the sensor independently of the host on receipt of the move destination, to thereby position the movable linear module at the move destination. Thus, since the move of the movable linear module and the positioning control are completed by the dedicated driver part which is independent of the host, the general configuration of the apparatus is simplified and high-speed positioning can be performed.

Thus, it is possible to cause a slider to stably transfer between linear modules in the long term and favorably transfer a transfer object, without performing any special precision adjustment.

BRIEF DESCRIPTION OF THE DRAWINGS

FIG. 3 is a flowchart showing an exemplary operation for transferring a transfer object by the transfer apparatus shown in FIG. 1;

DETAILED DESCRIPTION

Figure 1:
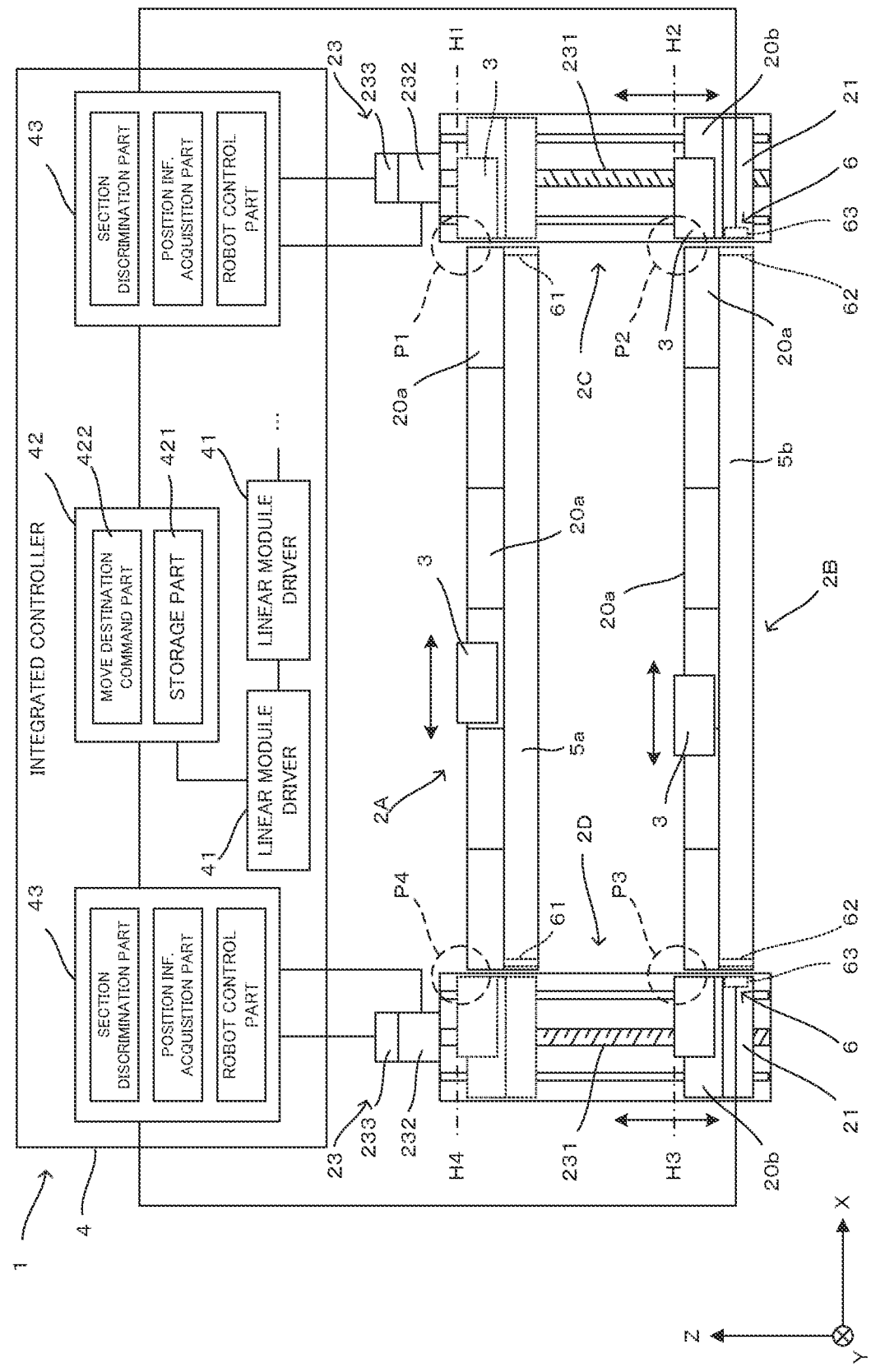
FIG. 1 is a view showing an overall configuration of a first embodiment of a transfer apparatus in accordance with the present disclosure.

FIG. 1 is a view showing an overall configuration of a first embodiment of a transfer apparatus in accordance with the present disclosure. This transfer apparatus 1 circularly transfers a transfer object in a vertical plane. For the following description, XYZ coordinate axes are set as shown in FIG. 1. Herein, the XY plane is a horizontal plane, and the X direction corresponds to a left-and-right direction (−X: left, +X: right), the Y direction corresponds to a front-and-rear direction (−Y: front, +Y: rear), and the Z direction corresponds to an up-and-down direction (+Z: up, −Z: down).

The transfer apparatus 1 has a pair of linear transfer parts 2A and 2B, a pair of vertical moving parts 2C and 2D, a plurality of sliders 3, and an integrated controller 4 for controlling the whole apparatus. The linear transfer part 2A is provided on an upper base 5a of a mount (not shown). On the other hand, the linear transfer part 2B is arranged on a lower base 5b of the mount, in parallel with the linear transfer part 2A, away therefrom toward the −Z side (downward in FIG. 1). In these linear transfer parts 2A and 2B, a plurality of (six in FIG. 1) linear modules 20a each provided with a stator are arranged in the X direction for each linear transfer part, and are fixed on the upper base 5a and the lower base 5b, respectively. Further, the plurality of sliders 3 are provided, being movable in the X direction with respect to the linear transfer parts 2A and 2B. A mover is connected to each of the sliders 3.

In order to individually control these twelve linear modules 20a and two linear modules 20b described later, the integrated controller 4 is provided with a plurality of linear module drivers 41. The linear module driver 41 has, for example, a function of individually energizing a coil of the stator provided in each of the linear modules 20a and 20b. Specifically, the linear module driver 41 is provided for each coil and has the function of individually energizing the corresponding coil. In the present embodiment, for example, five coils are provided in each of the linear modules 20a and two coils are provided in each of the linear modules 20b. Therefore, in the transfer apparatus 1 shown in FIG. 1, 64 (=5×12+2×2) coils are provided and 64 linear module drivers 41 are provided correspondingly. These linear module drivers 41 are cascaded to a host 42 of the integrated controller 4. When the host 42 outputs a command on a move destination of the slider 3 (hereinafter, referred to as a "move destination command"), in response to the move destination command, the linear module driver 41 energizes the corresponding coil to generate magnetic propulsion and thereby causes the slider 3 to move in the X direction. Further, since the respective structures of the linear module 20a and the slider 3 are the same as those in the apparatus disclosed in PTL 1, description on the structures will be omitted. Furthermore, when the linear transfer parts 2A and 2B are distinguished from each other in the description, the former is referred to as an "upper linear transfer part 2A" and the latter is referred to as a "lower linear transfer part 2B", meanwhile when these are not distinguished from each other, these are simply referred to as "linear transfer parts 2A and 2B".

The vertical moving part 2C is provided corresponding to side end portions of the linear transfer parts 2A and 2B on the +X side (on the right side of FIG. 1). The vertical moving part 2C has a function of moving the linear module 20b in the up-and-down direction Z to thereby couple the linear module 20b with the linear module 20a of the linear transfer part 2A or 2B. The linear module 20b has the same structure as that of the linear module 20a, but is movable and different in this point from the linear module 20a which is always fixed. Then, in the present specification, when the linear modules 20a and 20b are distinguished from each other in the description, the former is referred to as a "fixed linear module 20a" and the latter is referred to as a "movable linear module 20b", meanwhile when these are not distinguished from each other, these are simply referred to as "linear modules 20a and 20b".

Figure 2:
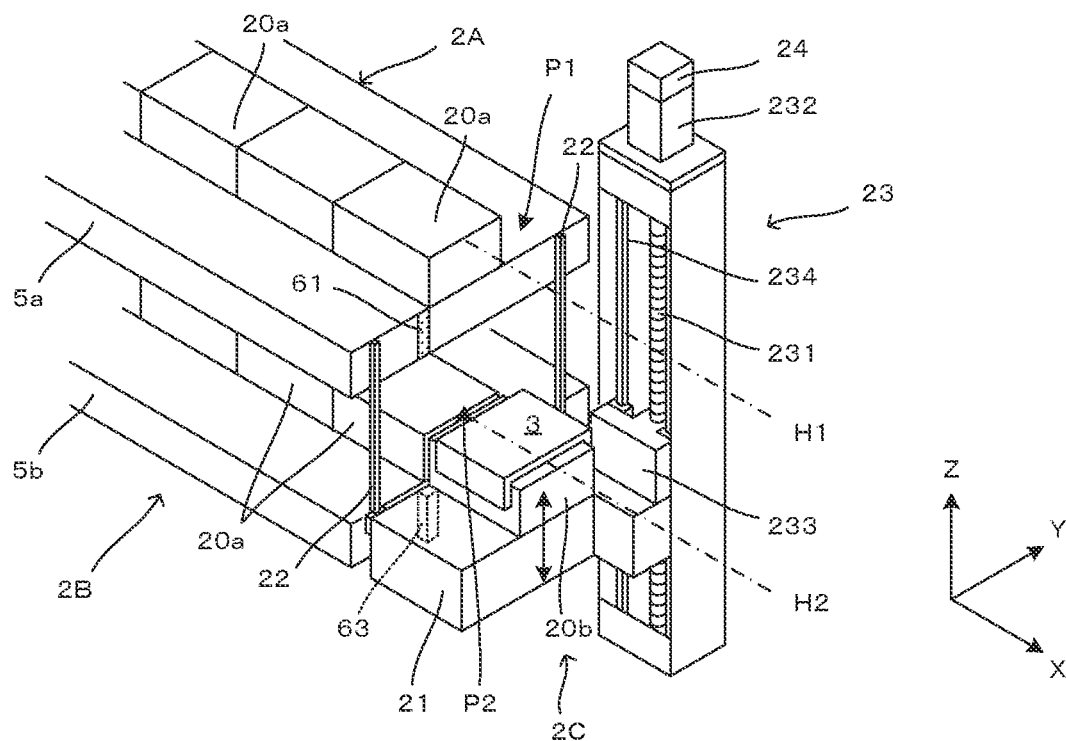
FIG. 2 is a view showing a configuration of a vertical moving part provided in the transfer apparatus shown in FIG. 1.

FIG. 2 is a view showing a configuration of the vertical moving part. The vertical moving part 2C has a plate-like module holding member 21 for holding the movable linear module 20b from below. This module holding member 21 is provided, being movable in the up-and-down direction Z along a pair of guide rails 22 and 22 extending in the up-and-down direction Z astride the upper base 5a and the lower base 5b. Further, a single-axis robot 23 is connected to the module holding member 21.

This single-axis robot 23 is a moving mechanism including, for example, a ball screw 231 in parallel with the Z direction and a motor 232 for rotationally driving the ball screw 231. Further, an encoder 24 is attached to the motor 232 of the single-axis robot 23. This encoder 24 outputs rotation information relating to the rotation of the motor 232, and gives the rotation information to a dedicated single-axis robot driver 43 for controlling the single-axis robot 23. Furthermore, in the single-axis robot 23, the ball screw 231 is threadedly engaged in a nut 233 and the module holding member 21 is attached to the nut 233. Further, the motor 232 and the encoder 24 are electrically connected to the single-axis robot driver 43 of the integrated controller 4. Moreover, a sensor of a linear scale, which will be described later in detail, is electrically connected to the single-axis robot driver 43.

Thus, in the present embodiment, information relating to a vertical position of the movable linear module 20b in the up-and-down direction Z is inputted to the single-axis robot driver 43 from the encoder 24 and the linear scale. Further, the single-axis robot driver 43 drive-controls the motor 232 on the basis of these pieces of information to thereby move the nut 233 along a guide rail 234 in the up-and-down direction Z. The nut 233, the module holding member 21, and the movable linear module 20b are thereby integrally moved in the up-and-down direction Z. As shown in FIGS. 1 and 2, for example, the single-axis robot 23 moves the movable linear module 20b to an end portion on the −Z direction side, to thereby position the movable linear module 20b at a vertical position (coupling position) H2 to face the lower linear transfer part 2B in the up-and-down direction Z. The movable linear module 20b is thereby positioned at a transfer position P2 and aligned with the fixed linear modules 20a of the linear transfer part 2B. Specifically, the movable linear module 20b is coupled with one of the fixed linear modules 20a constituting the linear transfer part 2B, which is positioned on the most +X side. As a result, it is possible to move the slider 3 between the vertical moving part 2C and the linear transfer part 2B.

On the other hand, though not shown in FIG. 1, the single-axis robot 23 moves the movable linear module 20b to an end portion on the +Z direction side, to thereby position the movable linear module 20b at a vertical position (coupling position) H1 to face the upper linear transfer part 2A in the up-and-down direction Z, and it is thereby possible to move the slider 3 between the vertical moving part 2C and the linear transfer part 2A. Therefore, it becomes possible to move the slider 3 from the linear transfer part 2A to the linear transfer part 2B and move the slider 3 from the linear transfer part 2B to the linear transfer part 2A through the vertical moving part 2C. Thus, when the linear transfer part 2A and the linear transfer part 2B correspond to a "first linear transfer part" and a "second linear transfer part" of the present disclosure, respectively, the vertical positions H1 and H2 correspond to respective examples of a "first coupling position" and a "second coupling position" of the present disclosure, the fixed linear module 20a of the linear transfer part 2A corresponds to an exemplary "first fixed linear module" of the present disclosure, and the fixed linear module 20a of the linear transfer part 2B corresponds to an exemplary "second fixed linear module" of the present disclosure. Further, a configuration of the linear scale and a move control of the movable linear module 20b by the single-axis robot driver 43 will be described later in detail.

The vertical moving part 2D is provided corresponding to side end portions of the linear transfer parts 2A and 2B on the −X side (on the right side of FIG. 1). The structure of the vertical moving part 2D is the same as that of the vertical moving part 2C. For this reason, it becomes possible to move the slider 3 from the linear transfer part 2A to the linear transfer part 2B and move the slider 3 from the linear transfer part 2B to the linear transfer part 2A on the −X side.

The integrated controller 4 has the host 42 for controlling the whole apparatus. This host 42 has a move destination command part 422 which determines a move destination of the slider 3 and the movable linear module 20b in accordance with a program stored in a storage part 421 and outputs the move destination to the linear module driver 41 and the single-axis robot driver 43.

The linear module driver 41 is provided for each coil of the stator. Each linear module driver 41 controls energization of the coil which is an object to be controlled in accordance with the move destination of the slider 3. Magnetic propulsion is thereby generated between the stators of the linear modules 20a and 20b and the mover connected to the slider 3, and the slider 3 is thereby moved in the X direction.

Further, the single-axis robot driver 43 is provided for each of the vertical moving parts 2C and 2D. Each single-axis robot driver 43 controls the rotation of the motor 232 which is an object to be controlled in accordance with the move destination of the movable linear module 20b. Specifically, when the slider 3 transfers between the linear transfer part 2A and the vertical moving parts 2C and 2D and the slider 3 transfers between the linear transfer part 2B and the vertical moving parts 2C and 2D, the command of the move destination of the movable linear module 20b is given to the single-axis robot driver 43. In a case where the transfer object is transferred from the upper linear transfer part 2A to the lower linear transfer part 2B through the vertical moving part 2C, for example, the move destination command part 422 of the host 42 gives a move destination command indicating that the movable linear module 20b of the vertical moving part 2C should be moved to the vertical position (coupling position) H1 and positioned at the vertical position H1. In response to the move destination command, the single-axis robot driver 43 for the vertical moving part 2C controls each of elements in the vertical moving part 2C independent of the host 42. After that, the linear module driver 41 drives the fixed linear module 20a of the linear transfer part 2A and the movable linear module 20b of the vertical moving part 2C. More specifically, the operation shown in FIG. 3 is performed, independently of the host 42.

Figure 4A:
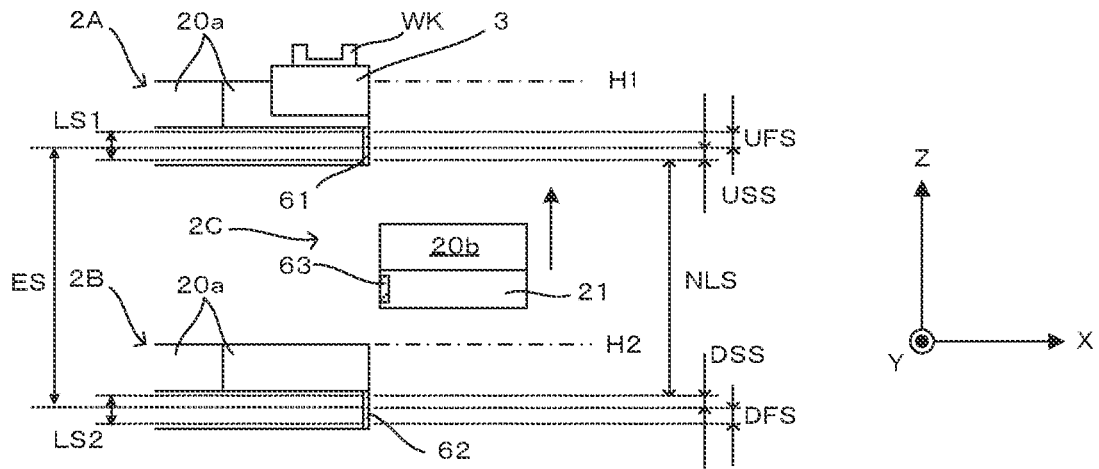
FIG. 4A is a view schematically showing an operation for causing a slider holding the transfer object to transfer from a fixed linear module to a movable linear module.
Figure 4B:
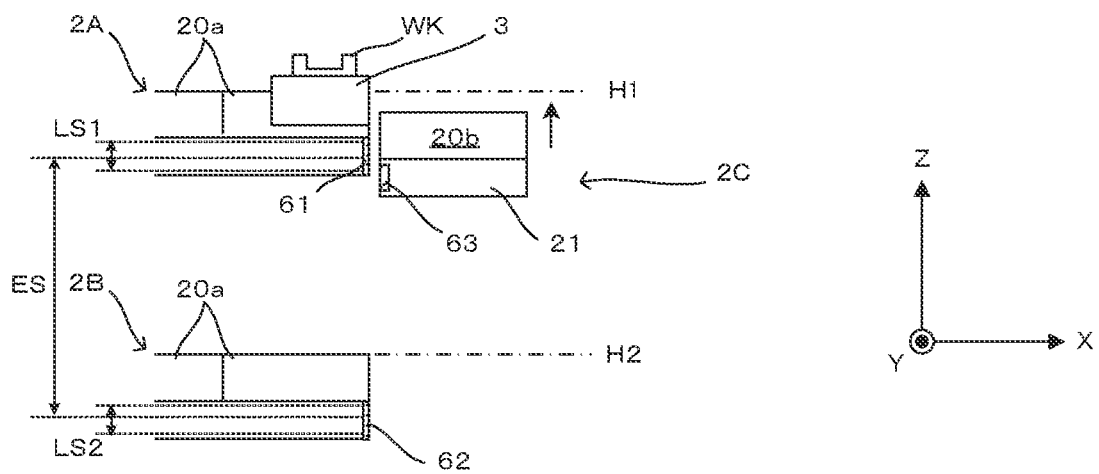
FIG. 4B is a view schematically showing an operation for causing the slider holding the transfer object to transfer from the fixed linear module to the movable linear module.
Figure 4C:
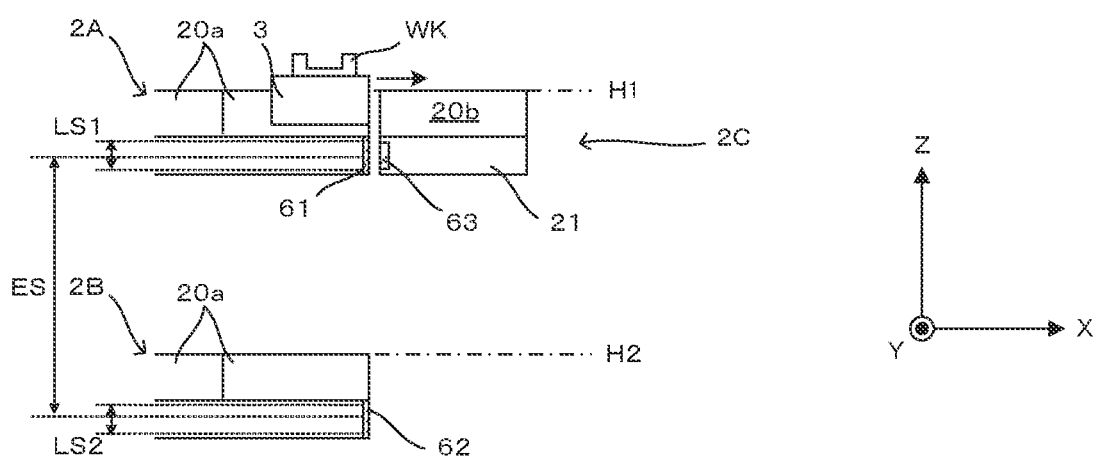
FIG. 4C is a view schematically showing an operation for causing the slider holding the transfer object to transfer from the fixed linear module to the movable linear module.

FIG. 3 is a flowchart showing an exemplary operation for transferring the transfer object by the transfer apparatus shown in FIG. 1. Further, FIGS. 4A to 4C are views schematically showing the operation for causing the slider holding the transfer object to transfer from the fixed linear module to the movable linear module. The linear module driver 41 moves the slider 3 holding the transfer object WK to a transfer position P1 as shown in FIG. 4A (Step S1). Further, concurrently with this, in response to the move destination command for the movable linear module 20b to the vertical position H1, the single-axis robot driver 43 raises and positions the empty movable linear module 20b to the vertical position H1 on the basis of various information from the encoder 24 and the linear scale (Step S2). Herein, prior to description on a raising and positioning process of the movable linear module 20b by the single-axis robot driver 43, the configuration of the linear scale or the like which is a technical feature of the present disclosure will be described with reference to FIGS. 2 and 4A to 4C.

The linear scale 6 has two scales 61 and 62 extending in the up-and-down direction Z and a sensor 63 for detecting position data provided in each of the scales 61 and 62. As a reading system of the position data, though there are systems mainly using a magnetic medium and mainly using an optical medium, a magnetic system is adopted in the present embodiment. Specifically, the scales 61 and 62 are magnetic scales and the sensor 63 is a magnetic sensor.

As shown in FIGS. 4A to 4C, the scale 61 is attached to an end surface of the upper base 5a on the +X side and the scale 62 is attached to an end surface of the lower base 5b on the +X side below the scale 61. Thus, in the present embodiment, the scales 61 and 62 are fixedly arranged on the mount (not shown), being away from each other in the up-and-down direction Z. Further, hereinafter, for distinguishing the scales 61 and 62 from each other in the description, the former is referred to as an "upper scale 61" and the latter is referred to as a "lower scale 62".

The sensor 63 is fixed on an end surface of the module holding member 21 on the −X side at a position away from the upper scale 61 and the lower scale 62 toward the +X side. Along with the up-and-down move of the module holding member 21 and the movable linear module 20b, the sensor 63 moves in the up-and-down direction Z. Especially as shown in FIG. 4A, while going through an upper linear scale section LS1 in the up-and-down direction Z, the sensor 63 faces the upper scale 61 to read the position data. The position data which are read include information relating to the position of the movable linear module 20b relative to the upper linear transfer part 2A in the up-and-down direction Z. Further, as shown in FIG. 4C, while going through a lower linear scale section LS2 in the up-and-down direction Z, the sensor 63 faces the lower scale 62 to read the position data. The position data which are read include information relating to the position of the movable linear module 20b relative to the lower linear transfer part 2B in the up-and-down direction Z. On the other hand, while going through between the upper linear scale sections LS1 and LS2, the sensor 63 faces neither the upper scale 61 nor the lower scale 62 and cannot read the position data.

Thus, in the present embodiment, a range in which the information (hereinafter, referred to as "linear scale information") relating to the position of the movable linear module 20b which can be detected by the linear scale 6 can be acquired is limited to the upper linear scale section LS1 and the lower linear scale section LS2. In contrast to this, a signal outputted from the encoder 24 includes information (hereinafter, referred to as "encoder information") relating to the position of the movable linear module 20b in the up-and-down direction Z. In other words, the vertical position of the movable linear module 20b can be acquired from the encoder information. Then, in the linear scale sections LS1 and LS2, the information relating to the vertical position of the movable linear module 20b may be acquired on the basis of the linear scale information and the movable linear module 20b may be controlled on the basis of this information. Further, in a section other than the linear scale sections LS1 and LS2 (including a non-linear scale section described later), the information relating to the vertical position of the movable linear module 20b may be acquired on the basis of the encoder information and the movable linear module 20b may be controlled on the basis of this information. The encoder 24, however, serves to detect the amount of rotation of the ball screw 231 by the motor 232, and it is difficult to accurately obtain the vertical position of the movable linear module 20b relative to the linear transfer part 2A or 2B from the amount of rotation.

Then, in the present embodiment, as shown in FIGS. 4A to 4C, a range ES for obtaining the encoder information is caused to partially overlap the linear scale sections LS1 and LS2, to thereby set five sections in the up-and-down direction Z. Specifically, these five sections are:

(1) Non-Linear Scale Section NLS:
 a section where the vertical position of the movable linear module 20b is acquired on the basis of only the encoder information detected by the encoder 24,
(2) Upper Synthesis Section USS:
 a partial section of the upper linear scale section LS1, which is adjacent to the non-linear scale section NLS, where the vertical position of the movable linear module 20b is acquired on the basis of the linear scale information read by detecting the upper scale 61 by the sensor 63 and the encoder information detected by the encoder 24,
(3) Upper Precise Detection Section UFS:
 a section of the upper linear scale section LS1 except the section USS, where the vertical position of the movable linear module 20b is acquired with high accuracy in the vicinity of the vertical position H1 on the basis of only the linear scale information read by detecting the upper scale 61 by the sensor 63,
(4) Lower Synthesis Section DSS:
 a partial section of the lower linear scale section LS2, which is adjacent to the non-linear scale section NLS, where the vertical position of the movable linear module 20b is acquired on the basis of the linear scale information read by detecting the lower scale 62 by the sensor 63 and the encoder information detected by the encoder 24, and
(5) Lower Precise Detection Section DFS:
 a section of the lower linear scale section LS2 except the section USS, where the vertical position of the movable linear module 20b is acquired with high accuracy in the vicinity of the vertical position H2 on the basis of only the linear scale information read by detecting the lower scale 62 by the sensor 63. Further, as shown in FIG. 5, the reason why the upper synthesis section USS and the lower synthesis section DSS are provided is that the discontinuity of the encoder information and the linear scale information is resolved, to thereby smoothly move the movable linear module 20b.

Figure 5:
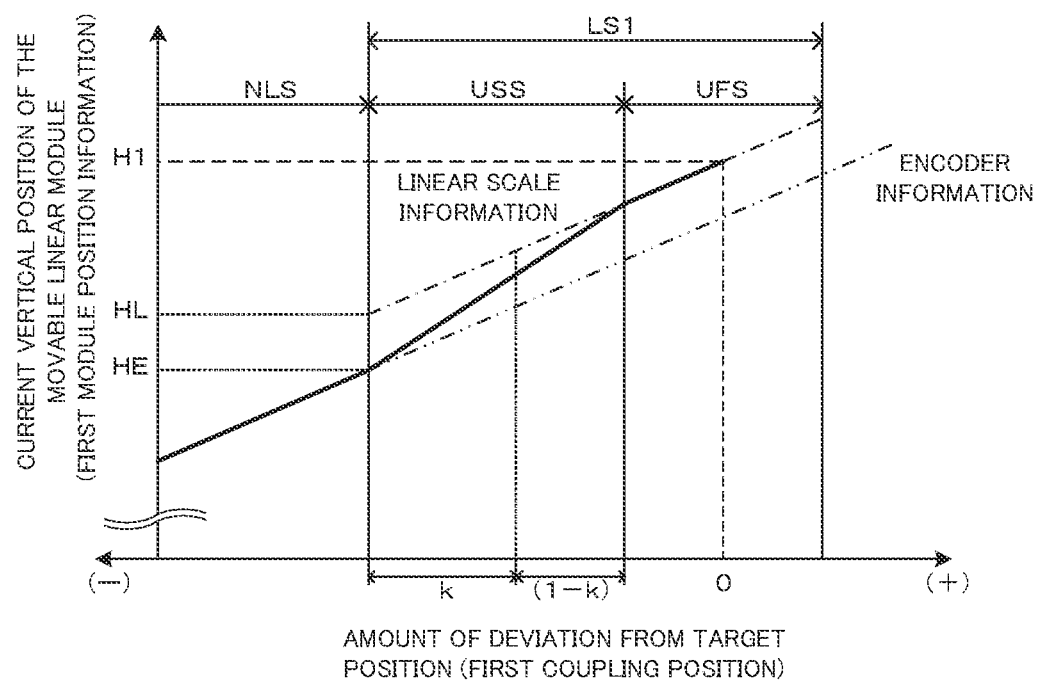
FIG. 5 is a graph showing a vertical position of the movable linear module, which is acquired on the basis of encoder information and linear scale information.

FIG. 5 is a graph showing the vertical position of the movable linear module, which is acquired on the basis of the encoder information and the linear scale information. This graph shows a case (indicated by a one-dot chain line) where a current vertical position of the movable linear module 20b which is moving upward toward a target position, i.e., the coupling position H1 is acquired from only the linear scale information and another case (indicated by a two-dot chain line) where the current vertical position is acquired from only the encoder information. As is clear from this comparison, these positions are discontinuous. At the point in time when the movable linear module 20b enters the upper linear scale section LS1 and can be detected by the linear scale 6, for example, the vertical position HL based on the linear scale information and the vertical position HE based on the encoder information are significantly different from each other. Therefore, when the upward-move control of the movable linear module 20b is switched from the encoder information to the linear scale information, there is sometimes a case where the movement speed of the movable linear module 20b is sharply changed. As a result, an impact is given to the slider 3 and it thereby becomes difficult to smoothly and stably transfer the transfer object WK, and in the worst case, the transfer object WK falls off from the slider 3.

Then, in the present embodiment, the upper synthesis section USS is provided, and the vertical position of the movable linear module 20b is acquired on the basis of the linear scale information and the encoder information. In more detail, as shown in FIG. 5, a weighting factor k (0≤k≤1) in accordance with the linear scale information (a detection result of the sensor 63) is obtained, and the vertical position of the movable linear module 20b is obtained on the basis of the following equation (1);

$$\text{the vertical position} = (\text{the linear scale information}) * k + (\text{the encoder information}) * (1-k) \quad \text{Eq. (1)}$$

With this equation, also in the upper synthesis section USS, the height of the movable linear module 20b can be continuously acquired. By controlling the upward move of the movable linear module 20b on the basis of the acquired vertical position, it is possible to cause the movable linear module 20b to smoothly move upward and go closer to the vertical position H1. Then, finally, the movable linear module 20b can be positioned at the vertical position H1 on the basis of the linear scale information accurately indicating the vertical position of the movable linear module 20b relative to the linear transfer part 2A. Further, the lower synthesis section DSS is provided for the same reason as the upper synthesis section USS.

Figure 6:
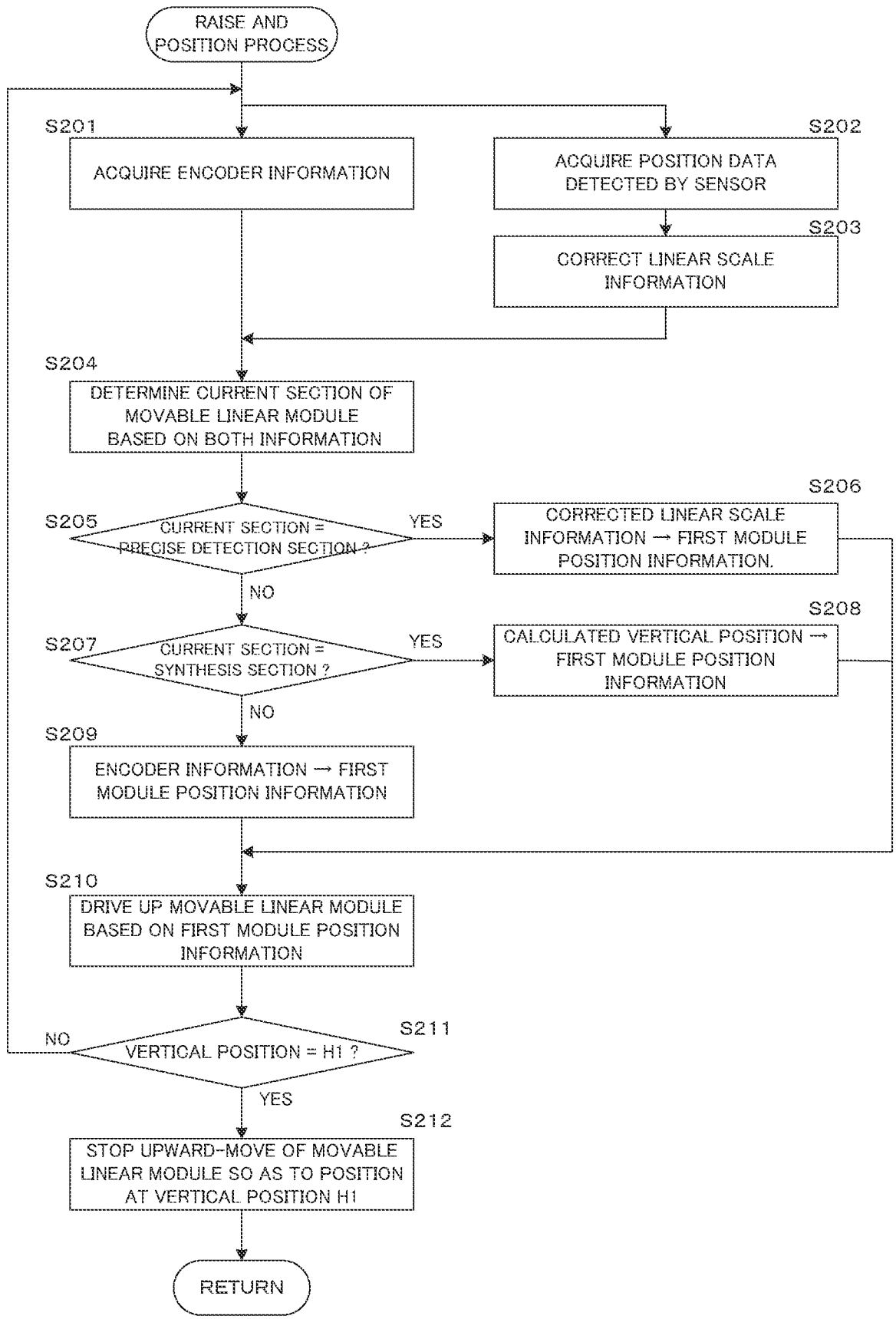
FIG. 6 is a flowchart showing a raising and positioning process of the movable linear module.

Next, the raising and positioning process of the movable linear module 20b (Step S2) will be described with reference to FIGS. 4A to 4C and 6. FIG. 6 is a flowchart showing the raising and positioning process of the movable linear module. This raising and positioning process is performed by the single-axis robot driver 43 on the basis of the linear scale information outputted from the sensor 63 and the encoder information outputted from the encoder 24. The single-axis robot driver 43 repeatedly performs the following Steps S201 to S211 until the empty movable linear module 20b is moved up and positioned to the vertical position H1.

In Step S201, the encoder information outputted from the encoder 24 is acquired. Concurrently with this, the position data Hs detected by the sensor 63 is acquired (Step S202), and further, a correction process is performed on the position data Hs, to thereby obtain the linear scale information which corresponds to the vertical position of the movable linear module 20b relative to the linear transfer part 2A (Step S203). More specifically, the encoder information Ha and the linear scale information Hb at the time when the section is switched from the non-linear scale section NLS to the upper synthesis section USS are instructed by an operator in advance and are stored in a memory (not shown) of the single-axis robot driver 43. Then, in Step S203, the linear scale information which corresponds to the vertical position of the movable linear module 20b is calculated on the basis of the following equation (2);

$$\text{the linear scale information} = (Hs - Hb) * KS + Ha \quad \text{Eq. (2)}$$

(where KS is scaling factor between the encoder and the linear scale)

On the basis of the two pieces of information relating to the vertical position of the movable linear module 20b which are obtained thus, a section in which the movable linear module 20b is positioned (hereinafter, referred to as a "current section") is determined (Step S204). When the current section is the precise detection section ("YES" in Step S205), the corrected linear scale information is determined as the vertical position of the movable linear module 20b, i.e., the first module position information (Step S206). When the current section is the synthesis section ("YES" in Step S207), the vertical position is calculated on the basis of the above Eq. (1) and determined as the first module position information (Step S208). When the current section is neither the upper precise detection section UFS nor the upper synthesis section USS, in other words, the current section is the non-linear scale section NLS ("NO" in Step S205), the encoder information is determined as the vertical position of the movable linear module 20b, i.e., the first module position information (Step S209).

On the basis of the first module position information of the movable linear module 20b which is determined as above, the movable linear module 20b is upward-move driven by the single-axis robot 23 (Step S210). Subsequently, it is determined whether or not the movable linear module 20b reaches the vertical position H1 (Step S211). While the movable linear module 20b does not reach the vertical position H1 ("NO" in Step S211), the process goes back to Steps S201 and S202 and the above series of process steps are repeated, and the movable linear module 20b gradually goes closer to the vertical position H1.

On the other hand, when it is confirmed that the movable linear module 20b reaches the vertical position H1, the upward-move drive of the movable linear module 20b by the single-axis robot 23 is stopped and the movable linear module 20b is positioned at the vertical position H1 (Step S212). As shown in FIG. 4C, the movable linear module 20b is thereby positioned at the transfer position P1 and coupled with one of the fixed linear modules 20a, which is positioned on the most +X side of the upper linear transfer part 2A.

With reference back to FIG. 3, description of the transfer process will be continued. When the move of the slider 3 to the transfer position P1 (Step S1) and the positioning of the movable linear module 20b (Step S2) are completed as above and transfer preparation of the slider 3 at the transfer position P1 is completed ("YES" in Step S3), the transfer of the slider 3 is performed in next Step S4. Specifically, the linear module driver 41 controls the energization of the coil of the stator and thereby moves the slider 3 holding the transfer object WK from the fixed linear module 20a to the movable linear module 20b as indicated by an arrow of FIG. 4C. The transfer object WK, while being held by the slider 3, is thereby moved from the upper linear transfer part 2A to the vertical moving part 2C (Step S4).

Subsequently, the host 42 gives the vertical position H2, as the move destination of the movable linear module 20b, to the single-axis robot driver 43 for drive-controlling the vertical moving part 2C. In response to this move destination command, the single-axis robot driver 43 lowers and positions the movable linear module 20b holding the transfer object WK to the vertical position H2 on the basis of the position data from the encoder 24 and the linear scale 6 (Step S5).

Figure 7:
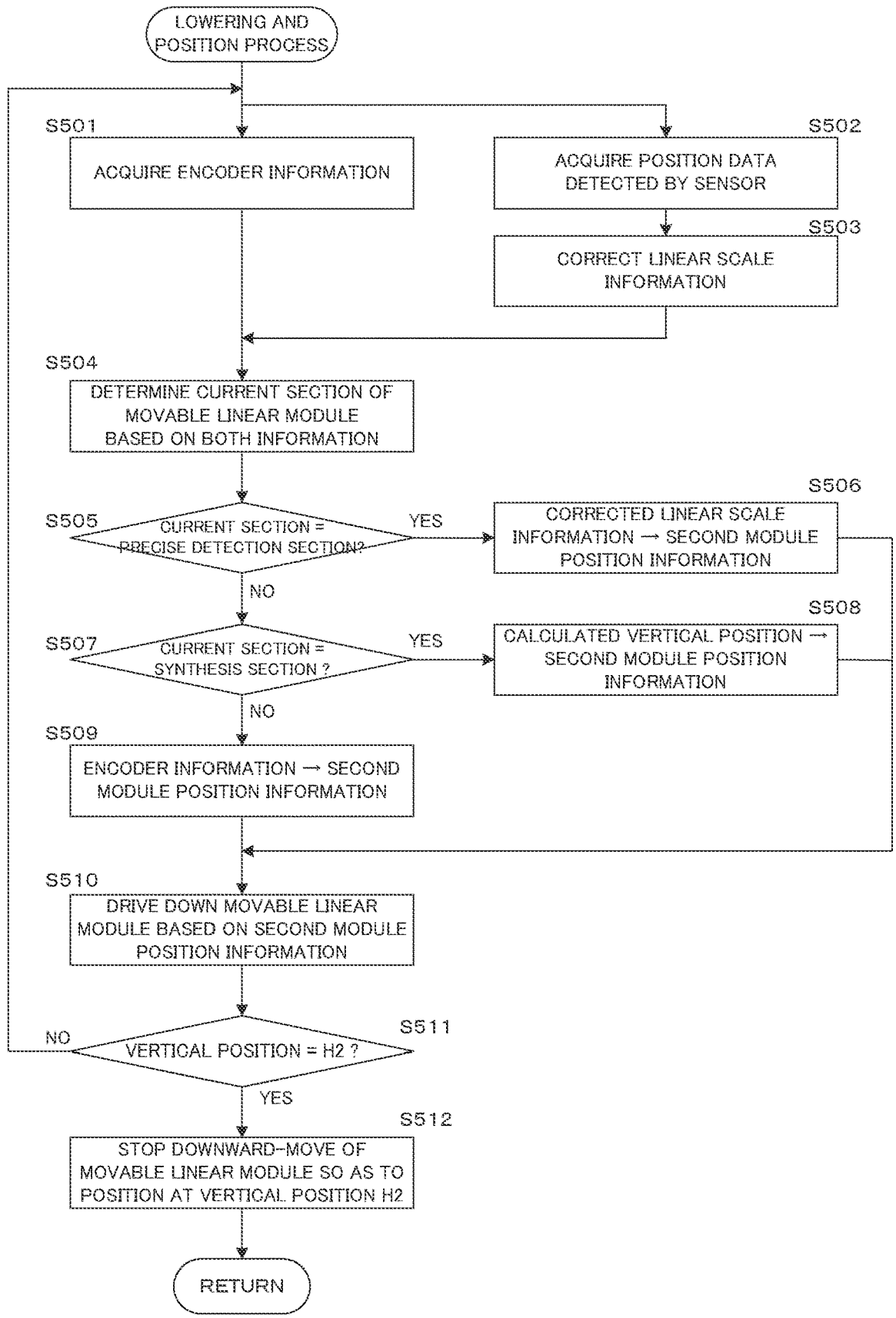
FIG. 7 is a flowchart showing a lowering and positioning process of the movable linear module.

FIG. 7 is a flowchart showing a lowering and positioning process of the movable linear module. This lowering and positioning process is performed by the single-axis robot driver 43 in the same manner as that of the raising and positioning process (Step S2). Specifically, until the movable linear module 20b holding the transfer object WK is moved down and positioned to the vertical position H2, the single-axis robot driver 43 acquires information relating to the vertical position of the movable linear module 20b in the up-and-down direction Z, i.e., "second module position information" of the present disclosure (Steps S501 to S509) and performs downward-move drive of the movable linear module 20b on the basis of the second module position information (Step S510). While the movable linear module 20b does not reach the vertical position H2 ("NO" in Step S511), the above series of process steps (Steps S501 to S510) are thereby repeated, and the movable linear module 20b gradually goes closer to the vertical position H2.

On the other hand, when it is confirmed that the movable linear module 20b reaches the vertical position H2, the downward-move drive of the movable linear module 20b by the single-axis robot 23 is stopped and the movable linear module 20b is positioned at the vertical position H2 (Step S512). The movable linear module 20b, while holding the transfer object WK, is thereby positioned at the transfer position P2 and coupled with one of the fixed linear modules 20a, which is positioned on the most +X side of the lower linear transfer part 2B.

With reference back to FIG. 3, description of the transfer process will be continued. When the positioning of the movable linear module 20b at the vertical position H2 (Step S5) is completed as above, the transfer of the slider 3 is performed in next Step S6. Specifically, the linear module driver 41 controls the energization of the coil of the stator and thereby moves the slider 3 holding the transfer object WK from the movable linear module 20b to the fixed linear module 20a. The transfer object WK, while being held by the slider 3, is thereby moved from the vertical moving part 2C to the lower linear transfer part 2B (Step S6).

Further, the scales 61 and 62 are attached to the end surfaces of the upper base 5a and the lower base 5b on the −X side (on the left side of FIG. 1), respectively, and fixed on the end surface of the module holding member 21 of the vertical moving part 2D on the +X side. The transfer of the transfer object WK from the lower linear transfer part 2B to the upper linear transfer part 2A through the vertical moving part 2D is also performed in the same manner as above. Thus, in the first embodiment, it is possible to transfer the transfer object WK by so-called vertical circulation.

As described above, in the first embodiment, while the scales 61 and 62 extending in the up-and-down direction Z are attached to the linear transfer parts 2A and 2B, respectively, the sensor 63 is attached to the vertical moving parts 2C and 2D. Specifically, it is possible to accurately acquire the first module position information and the second module position information indicating the respective positions of the movable linear module 20b relative to the fixed linear modules 20a in the up-and-down direction Z by the linear scale 6. Then, the movable linear module 20b is accurately positioned at the vertical positions H1 and H2 on the basis of the first module position information and the second module position information. Further, also in the vertical moving part 2D, like in the vertical moving part 2C, the movable linear module 20b is accurately positioned at vertical positions H3 and H4 (see FIG. 1). As a result, without performing any special precision adjustment like in the background art, it is possible to cause the slider 3 to stably transfer between the fixed linear module 20a and the movable linear module 20b in the long term. As a result, it is possible to favorably transfer the transfer object WK.

Further, in order to acquire the module position information indicating the position of the movable linear module 20b in the up-and-down direction Z by the sensor 63, for example, the scale may be extended from the upper base 5a to the lower base 5b. The lengthening of the scale, however, causes a cost increase of the linear scale 6. In contrast to this, in the first embodiment, the short scale 61 which is favorable for acquiring the first module position information and the short scale 62 which is favorable for acquiring the second module position information are provided. In other words, since the module position information is acquired by the minimum necessary scale, it is possible to effectively suppress the cost of the linear scale 6.

Further, in the first embodiment, in the non-linear scale section NLS where detection cannot be performed in the up-and-down direction Z in the vertical moving part 2C, the movable linear module 20b is moved on the basis of the encoder information. Moreover, in the upper synthesis section USS and the lower synthesis section DSS, the module position information is acquired by synthesizing the encoder information and the linear scale information. For this reason, it is possible to prevent a sharp change in the movement speed of the movable linear module 20b and smoothly move the movable linear module 20b between the vertical positions H1 and H2. In this respect, the same applies to the vertical moving part 2D, and it is possible to smoothly move the movable linear module 20b between the vertical positions H3 and H4 (see FIG. 1). As a result, it is possible to cause the slider 3 to stably transfer between the fixed linear module 20a and the movable linear module 20b at transfer positions P3 and P4 (see FIG. 1).

Furthermore, in the first embodiment, when receiving the move destination command from the host 42, the single-axis robot driver 43 determines the section in which the movable linear module 20b is present, from the encoder information and the linear scale information, and acquires the module position information in the corresponding aspect and controls the single-axis robot 23 on the basis of the module position information. Specifically, as shown in FIG. 1, the single-axis robot driver 43 includes a section discrimination part, a position information acquisition part, and a robot control part and serves as a dedicated driver part for performing a move and a positioning control of the movable linear module 20b independently of the host 42. For this reason, the configuration of the transfer apparatus 1, particularly the configuration for control is simplified and high-speed positioning of the movable linear module 20b can be performed. As a result, it is possible to increase the throughput of the transfer apparatus 1.

Thus, in the first embodiment, the upper base 5a and the lower base 5b correspond to respective examples of a "first base" and a "second base" of the present disclosure. Further, the X direction and the Z direction correspond to a "first direction" and a "second direction" of the present disclosure, respectively. The vertical moving parts 2C and 2D correspond to one example of a "module moving part" of the present disclosure. The position data detected by the sensor 63 correspond to one example of a "detection result of the sensor" of the present disclosure. The integrated controller 4 corresponds to an exemplary "control part" of the present disclosure.

Figure 8:
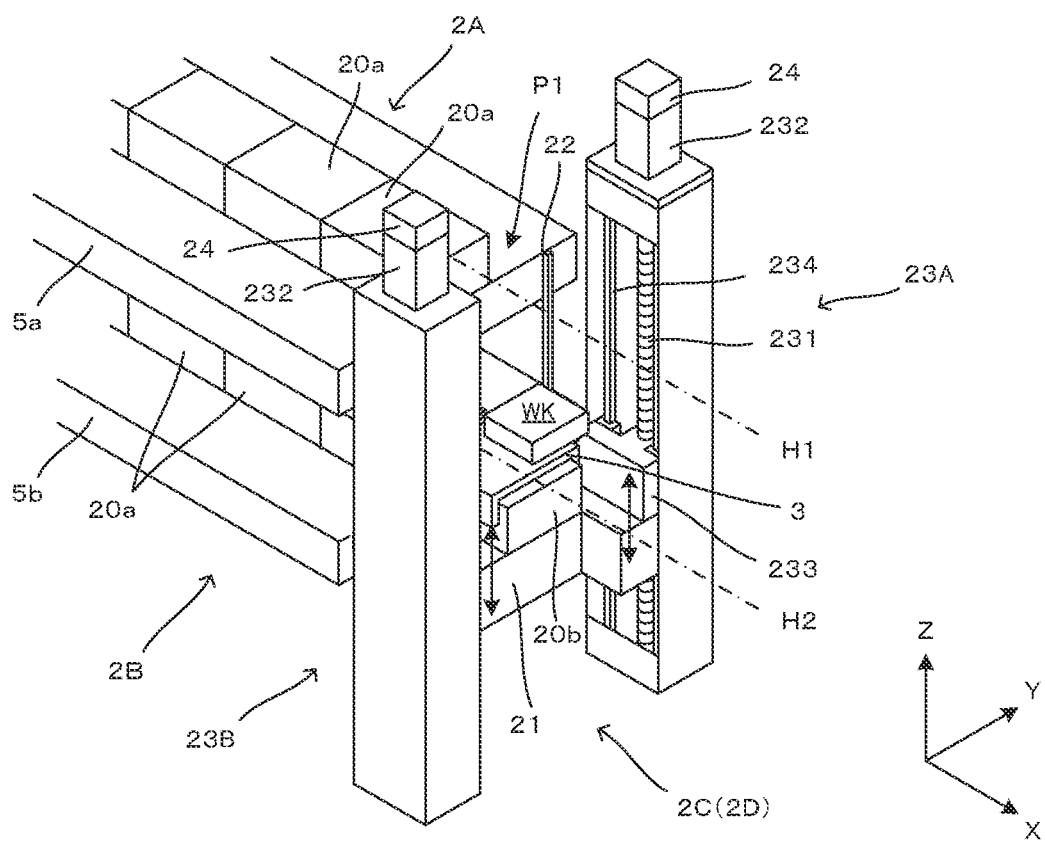
FIG. 8 is a perspective view showing a configuration of the vertical moving part in a second embodiment of the transfer apparatus in accordance with the present disclosure.

FIG. 8 is a perspective view showing a configuration of the vertical moving part in a second embodiment of the transfer apparatus in accordance with the present disclosure. The second embodiment is significantly different from the first embodiment (FIG. 2) in the configuration of the vertical moving part 2C (2D), and other constituent elements are the same as those of the first embodiment. Therefore, description will be made below centering on the difference, and identical constituent elements are represented by the same reference signs and description thereof will be omitted.

In the second embodiment, the module holding member 21 is coupled with two single-axis robots 23. In more detail, a rear-side portion of the module holding member 21 is joined to the nut 233 of a rear-side single-axis robot 23A. A front-side portion of the module holding member 21 is joined to the nut (not shown) of a front-side single-axis robot 23B. Though not shown in FIG. 8, the linear scale (see FIGS. 1 and 4A to 4C) and the single-axis robot driver 43 are provided for each of the single-axis robots 23A and 23B.

In the vertical moving part 2C (2D) having such a configuration, when receiving the move destination command from the host 42, the single-axis robots 23A and 23B operate independently of each other to move the rear-side portion and the front-side portion of the module holding member 21 up and down in the same direction Z, respectively. The module holding member 21 is thereby moved up and down on the whole. Herein, for example, as shown in this figure, the transfer object WK on the slider 3 protrudes rearward (toward the +Y side), and when the barycentric position (not shown) is tilted rearward, sometimes, the movable linear module 20b is accordingly tilted. In such a state, the transfer operation cannot be smoothly performed.

Then, in the second embodiment, a move control of the module holding member 21 by the front-side single-axis robot 23B on the basis of the detection result of the sensor of the linear scale provided on the front side and that of the module holding member 21 by the rear-side single-axis robot 23A on the basis of the detection result of the sensor of the linear scale provided on the rear side are performed independently of each other. With the tilt of the movable linear module 20b thereby corrected, the movable linear module 20b is coupled with the fixed linear module 20a. As a result, with the tilt of the movable linear module 20b corrected, it is possible to smoothly and stably perform the transfer between the movable linear module 20b and the fixed linear module 20a.

Thus, in the second embodiment, the single-axis robots 23A and 23B correspond to respective examples of a "first moving mechanism" and a "second moving mechanism" of the present disclosure. Further, the rear-side portion and the front-side portion of the module holding member 21 correspond to respective examples of a "first holding portion" and a "second holding portion" of the present disclosure.

Furthermore, the present disclosure is not limited to the above-described embodiments and numerous modifications and variations can be added to those described above without departing from the scope of the disclosure. Then, though the present disclosure is applied to the so-called vertical circulation type transfer apparatus 1, for example, in the first embodiment and the second embodiment described above, the present disclosure can be applied to a so-called horizontal circulation type transfer apparatus 1 as shown in, for example, FIGS. 9 and 10.

Figure 9:
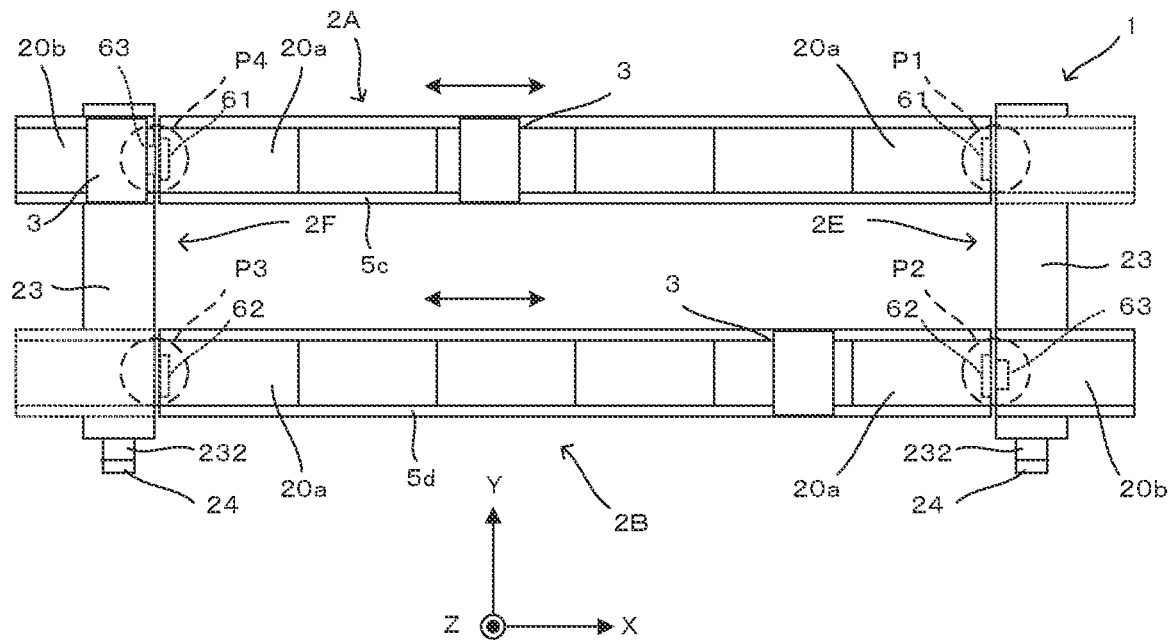
FIG. 9 is a view showing a third embodiment of the transfer apparatus in accordance with the present disclosure.

FIG. 9 is a view showing a third embodiment of the transfer apparatus in accordance with the present disclosure. The transfer apparatus 1 has the pair of linear transfer parts 2A and 2B, horizontal moving parts 2E and 2F, and the plurality of sliders 3. The linear transfer part 2A is provided on a base 5c of a mount (not shown). On the other hand, the linear transfer part 2B is arranged in parallel with the linear transfer part 2A on a base 5d arranged in parallel with the base 5c, away therefrom toward the +Y side. Further, the configurations of the linear transfer parts 2A and 2B are the same as those in the first embodiment. The horizontal moving part 2E is provided corresponding to the side end portions of the linear transfer parts 2A and 2B on the +X side (on the right side of FIG. 9). The horizontal moving part 2E has a function of moving the movable linear module 20b in the horizontal direction Y to thereby couple the movable linear module 20b with the fixed linear module 20a of the linear transfer part 2A or 2B.

Figure 10:
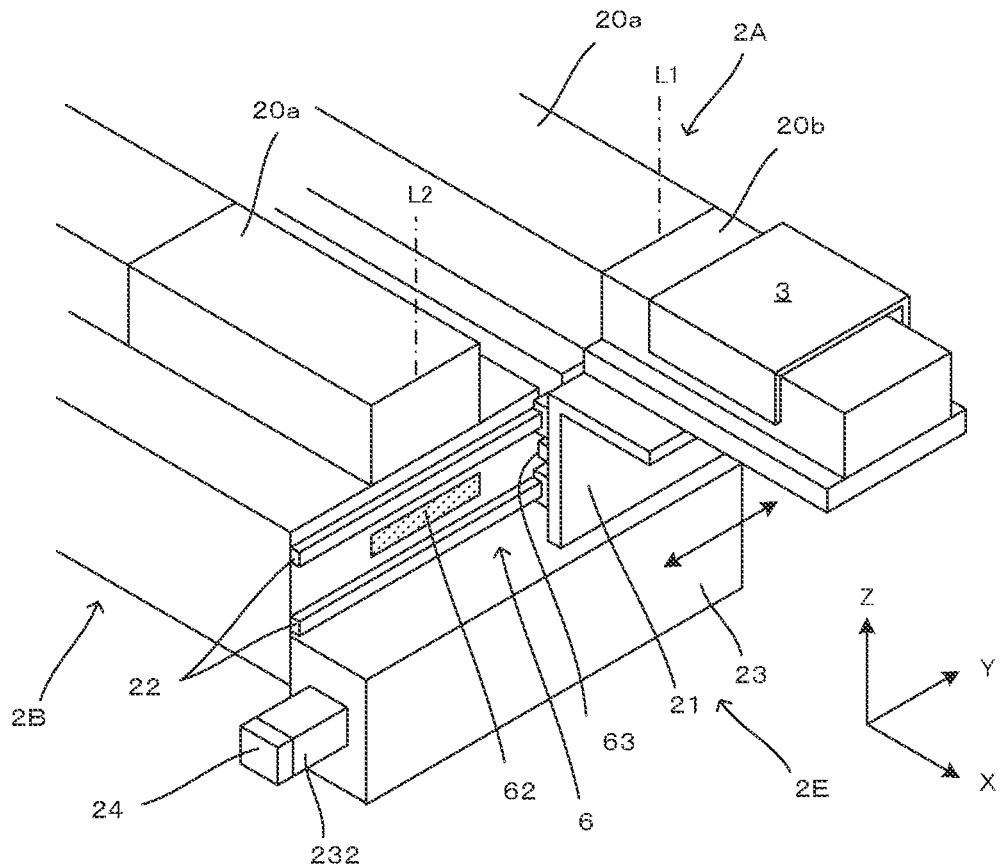
FIG. 10 is a view showing a configuration of a horizontal moving part provided in the transfer apparatus shown in FIG. 9.

FIG. 10 is a view showing a configuration of the horizontal moving part. The horizontal moving part 2E has the module holding member 21 having a substantially L-shaped section for holding the movable linear module 20b from below. This module holding member 21 is provided, being movable in the horizontal direction Y along the pair of guide rails 22 and 22 extending in the horizontal direction Y astride the bases 5c and 5d. Then, the single-axis robot 23 is connected to the module holding member 21.

This single-axis robot 23 is a moving mechanism including, for example, a ball screw (not shown) in parallel with the Y direction and the motor 232 for rotationally driving the ball screw. The encoder 24 is attached to the motor 232 of the single-axis robot 23, and this encoder 24 outputs the rotation information relating to the rotation of the motor 232 to a dedicated single-axis robot driver (not shown) for controlling the single-axis robot 23. In the single-axis robot 23, when the motor 232 is drive-controlled by the single-axis robot driver, the module holding member 21 and the movable linear module 20b are integrally moved in the horizontal direction Y along the guide rails 22 and 22. As shown in FIG. 9, for example, the movable linear module 20b is thereby positioned at a horizontal position L2 and aligned with the fixed linear modules 20a of the linear transfer part 2B at the transfer position P2. Conversely, when the motor 232 is reversely rotated, as shown in FIG. 10, for example, the movable linear module 20b is positioned at a horizontal position L1 and aligned with the fixed linear modules 20a of the linear transfer part 2A at the transfer position P1. It thereby becomes possible to perform the transfer of the slider 3 at the transfer positions P1 and P2. Further, the horizontal moving part 2F has the same configuration as that of the horizontal moving part 2E, and with a horizontal move of the movable linear module 20b, it becomes possible to perform the transfer of the slider 3 at the transfer positions P3 and P4.

In the transfer apparatus 1 having such a configuration, the scales 61 and 62 extending in the Y direction are attached to the bases 5c and 5d, respectively. The sensor 63 is attached to the module holding member 21 of the horizontal moving part 2E. Thus, the linear scale 6 is provided on the side of the horizontal moving part 2E. The linear scale 6 is provided also on the side of the horizontal moving part 2F.

The sensor 63 is electrically connected to the single-axis robot driver (not shown). Then, like in the first embodiment, the single-axis robot driver acquires the module position information indicating a position of the movable linear module 20b relative to the fixed linear module 20a in the horizontal direction Y on the basis of the detection result of the sensor 62. Then, the single-axis robot driver controls the move of the module holding member 21 on the basis of the module position information, to thereby position the movable linear module 20b at the positions L1 and L2. As a result, without performing any special precision adjustment like in the background art, it is possible to cause the slider 3 to stably transfer between the fixed linear module 20a and the movable linear module 20b in the long term. As a result, it is possible to favorably transfer the transfer object WK.

Thus, in the third embodiment, the bases 5c and 5d correspond to respective examples of a "first base" and a "second base" of the present disclosure. Further, the Y direction corresponds to a "second direction" of the present disclosure. Furthermore, the horizontal moving parts 2E and 2F each correspond to an exemplary "module moving part" of the present disclosure.

Further, in the above-described embodiments, the scales 61 and 62 are attached to the linear transfer parts 2A and 2B, respectively, and the sensor 63 is attached to the module moving parts (the vertical moving parts 2C and 2D and the horizontal moving parts 2E and 2F). The arrangement relation between the scale and the sensor, however, may be reversed from that of the above-described embodiments.

Furthermore, though the module position information is acquired by always synthesizing the encoder information and the linear scale information in the upper synthesis section USS and the lower synthesis section DSS in the first embodiment, detection characteristics of the linear scale 6 may be considered. The detection characteristics indicate that in an area near the non-linear scale section, i.e., an area where the sensor 63 starts to face the scales 61 and 62 even in the synthesis sections USS and DSS, the detection by the sensor 63 is unstable. In the linear scale 6 having the detection characteristics, sometimes, the accurate position data is not outputted from the sensor 63. Then, there may be a case where it is determined whether or not the position data is normally outputted from the sensor 63 and then the use of the linear scale information (position data) is determined. In other words, while it is determined that the output of the position data is abnormal, the module position information may be acquired on the basis of only the encoder information regardless of the section (the fourth embodiment).

Further, through the present disclosure is applied to the transfer apparatus 1 having the two linear transfer parts 2A and 2B in the above-described embodiments, the present disclosure can be applied to a transfer apparatus having three or more linear transfer parts. Furthermore, though the number of fixed linear modules 20a constituting each of the linear transfer parts 2A and 2B is six in the above-described embodiments, the number is not limited to this but may be any number.

The present disclosure can be applied to a general transfer technology for positioning a movable linear module relative to a fixed linear module and then causing a slider to transfer between the fixed linear module and the movable linear module, to thereby transfer a transfer object.

What is claimed is:

1. A transfer apparatus for moving a slider holding a transfer object to thereby transfer the transfer object, the apparatus comprising:
    a first linear transfer part configured to move the slider in a first direction by using a first fixed linear module fixed on a first base;
    a module moving part configured to move a module holding member holding a movable linear module in a second direction different from the first direction, to thereby position the movable linear module at a first coupling position where the movable linear module couples with the first fixed linear module and to cause the slider to transfer between the movable linear module and the first fixed linear module;
    a linear scale having a scale extending in the second direction and a sensor configured to detect the scale, in which one of the scale and the sensor is attached to the first linear transfer part and the other is attached to the module moving part; and
    a controller configured to acquire first module position information indicating a position of the movable linear module relative to the first fixed linear module in the second direction on the basis of a detection result of the sensor and to control a move of the module holding member on the basis of the first module position information.

2. The transfer apparatus according to claim 1, wherein the module moving part has a moving mechanism configured to move the module holding member in the second direction and an encoder configured to acquire encoder information indicating a position of the module holding member in the second direction, and
    the controller is configured to acquire the first module position information on the basis of the detection result of the sensor and the encoder information and position the movable linear module at the first coupling position on the basis of the first module position information.

3. The transfer apparatus according to claim 2, wherein a section where the sensor detects the scale in the second direction is determined as a linear scale section and another section where the sensor does not detect the scale is determined as a non-linear scale section, and
    the controller is configured to acquire the first module position information on the basis of the detection result of the sensor in the linear scale section and acquires the first module position information on the basis of the encoder information in the non-linear scale section.

4. The transfer apparatus according to claim 3, further comprising:
    a second linear transfer part configured to move the slider in the first direction by using a second fixed linear module fixed on a second base positioned away from the first base in the second direction,
    wherein the module moving part is configured to position the movable linear module at a second coupling position where the movable linear module couples with the second fixed linear module and make it possible to cause the slider to transfer between the movable linear module and the second fixed linear module, and
    the controller is configured to acquire second module position information indicating a position of the movable linear module relative to the second fixed linear module in the second direction on the basis of the detection result of the sensor and move the movable linear module between the first coupling position and the second coupling position on the basis of the first module position information and the second module position information.

5. The transfer apparatus according to claim 3, wherein the controller has:
    a host configured to instruct a move destination of the movable linear module; and
    a dedicated driver part configured to control the move of the module holding member on the basis of the detection result of the sensor independently of the host on receipt of the move destination, to thereby position the movable linear module at the move destination.

6. The transfer apparatus according to claim 2, wherein a section where the sensor detects the scale in the second direction is determined as a linear scale section, another section where the sensor does not detect the scale is determined as a non-linear scale section, and a partial section of the linear scale section, which is adjacent to the non-linear scale section, is determined as a synthesis section, and
    the controller is configured to acquire the first module position information on the basis of the detection result of the sensor in a precise detection section which is the linear scale section except the synthesis section, acquire the first module position information on the basis of the detection result of the sensor and the encoder information in the synthesis section, and acquire the first module position information on the basis of the encoder information in the non-linear scale section.

7. The transfer apparatus according to claim 6, wherein the controller is configured to obtain a weighting factor k ($0 \le k \le 1$) in accordance with the detection result of the sensor in the synthesis section and obtains the first module position information on the basis of the following equation;

(the first module position information)=(the detection result of the sensor)*k+(the encoder information)*(1−k).

8. The transfer apparatus according to claim 7, further comprising:
a second linear transfer part configured to move the slider in the first direction by using a second fixed linear module fixed on a second base positioned away from the first base in the second direction,
wherein the module moving part is configured to position the movable linear module at a second coupling position where the movable linear module couples with the second fixed linear module and make it possible to cause the slider to transfer between the movable linear module and the second fixed linear module, and
the controller is configured to acquire second module position information indicating a position of the movable linear module relative to the second fixed linear module in the second direction on the basis of the detection result of the sensor and move the movable linear module between the first coupling position and the second coupling position on the basis of the first module position information and the second module position information.

9. The transfer apparatus according to claim 7, wherein the controller has:
a host configured to instruct a move destination of the movable linear module; and
a dedicated driver part configured to control the move of the module holding member on the basis of the detection result of the sensor independently of the host on receipt of the move destination, to thereby position the movable linear module at the move destination.

10. The transfer apparatus according to claim 6, further comprising:
a second linear transfer part configured to move the slider in the first direction by using a second fixed linear module fixed on a second base positioned away from the first base in the second direction,
wherein the module moving part is configured to position the movable linear module at a second coupling position where the movable linear module couples with the second fixed linear module and make it possible to cause the slider to transfer between the movable linear module and the second fixed linear module, and
the controller is configured to acquire second module position information indicating a position of the movable linear module relative to the second fixed linear module in the second direction on the basis of the detection result of the sensor and move the movable linear module between the first coupling position and the second coupling position on the basis of the first module position information and the second module position information.

11. The transfer apparatus according to claim 6, wherein the controller has:
a host configured to instruct a move destination of the movable linear module; and
a dedicated driver part configured to control the move of the module holding member on the basis of the detection result of the sensor independently of the host on receipt of the move destination, to thereby position the movable linear module at the move destination.

12. The transfer apparatus according to claim 2, further comprising:
a second linear transfer part configured to move the slider in the first direction by using a second fixed linear module fixed on a second base positioned away from the first base in the second direction,
wherein the module moving part is configured to position the movable linear module at a second coupling position where the movable linear module couples with the second fixed linear module and make it possible to cause the slider to transfer between the movable linear module and the second fixed linear module, and
the controller is configured to acquire second module position information indicating a position of the movable linear module relative to the second fixed linear module in the second direction on the basis of the detection result of the sensor and move the movable linear module between the first coupling position and the second coupling position on the basis of the first module position information and the second module position information.

13. The transfer apparatus according to claim 2, wherein the controller has:
a host configured to instruct a move destination of the movable linear module; and
a dedicated driver part configured to control the move of the module holding member on the basis of the detection result of the sensor independently of the host on receipt of the move destination, to thereby position the movable linear module at the move destination.

14. The transfer apparatus according to claim 1, further comprising:
a second linear transfer part configured to move the slider in the first direction by using a second fixed linear module fixed on a second base positioned away from the first base in the second direction,
wherein the module moving part is configured to position the movable linear module at a second coupling position where the movable linear module couples with the second fixed linear module and make it possible to cause the slider to transfer between the movable linear module and the second fixed linear module, and
the controller is configured to acquire second module position information indicating a position of the movable linear module relative to the second fixed linear module in the second direction on the basis of the detection result of the sensor and move the movable linear module between the first coupling position and the second coupling position on the basis of the first module position information and the second module position information.

15. The transfer apparatus according to claim 14, wherein the controller has:
a host configured to instruct a move destination of the movable linear module; and
a dedicated driver part configured to control the move of the module holding member on the basis of the detection result of the sensor independently of the host on receipt of the move destination, to thereby position the movable linear module at the move destination.

16. The transfer apparatus according to claim 1, wherein the module moving part has a first moving mechanism coupled with a first holding portion of the module holding member and a second moving mechanism coupled with a second holding portion of the module holding member, which is different from the first holding portion, the first moving mechanism being configured to move the module holding member in the second direction, the second moving mechanism being configured to move the module holding member in the second direction, and the linear scale is positioned corresponding to each of the first moving mechanism and the second moving mechanism.

17. The transfer apparatus according to claim 16, wherein the controller has:
a host configured to instruct a move destination of the movable linear module; and
a dedicated driver part configured to control the move of the module holding member on the basis of the detection result of the sensor independently of the host on receipt of the move destination, to thereby position the movable linear module at the move destination.

18. The transfer apparatus according to claim 1, wherein the controller has:
a host configured to instruct a move destination of the movable linear module; and
a dedicated driver part configured to control the move of the module holding member on the basis of the detection result of the sensor independently of the host on receipt of the move destination, to thereby position the movable linear module at the move destination.

19. A transfer method for moving a slider holding a transfer object between a linear transfer part for moving the slider in a first direction by using a fixed linear module fixed on a base and a module moving part for moving a module holding member holding a movable linear module in a second direction different from the first direction, to thereby transfer the transfer object,
wherein a scale is attached to one of the linear transfer part and the module moving part, extending in the second direction, and a sensor for detecting the scale is attached to the other,
the transfer method comprising:
acquiring module position information indicating a position of the movable linear module relative to the fixed linear module in the second direction on the basis of a detection result of the sensor;
moving the module holding member in the second direction on the basis of the module position information to thereby position the movable linear module at a coupling position where the movable linear module couples with the fixed linear module and making it possible to cause the slider to transfer between the movable linear module and the fixed linear module; and
moving the slider in the first direction between the fixed linear module and the movable linear module which are coupled with each other.

\* \* \* \* \*